United States Patent
Noborio et al.

(10) Patent No.: US 7,523,732 B2
(45) Date of Patent: Apr. 28, 2009

(54) INTAKE CONTROL DEVICE FOR A VEHICLE

(75) Inventors: Daichi Noborio, Shizuoka-ken (JP); Hidenori Akatsuka, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/856,975

(22) Filed: Sep. 18, 2007

(65) Prior Publication Data
US 2008/0092842 A1    Apr. 24, 2008

(30) Foreign Application Priority Data
Sep. 20, 2006  (JP) ............................. 2006-255051

(51) Int. Cl.
*F02M 35/10* (2006.01)
(52) U.S. Cl. .............................. 123/184.55; 123/184.53
(58) Field of Classification Search ............ 123/184.55, 123/184.53
See application file for complete search history.

(56) References Cited

U.S. PATENT DOCUMENTS

| 4,565,166 | A | * | 1/1986 | Takeda ................... 123/184.55 |
| 4,858,568 | A | * | 8/1989 | Obayashi et al. ........ 123/184.55 |
| 5,000,130 | A | * | 3/1991 | Yamada ................. 123/184.55 |
| 5,704,328 | A | * | 1/1998 | Dykstra et al. ......... 123/184.55 |
| 7,213,559 | B2 | * | 5/2007 | Kobori .................. 123/184.55 |

FOREIGN PATENT DOCUMENTS

JP    09-100720    4/1997

* cited by examiner

*Primary Examiner*—Noah Kamen
(74) *Attorney, Agent, or Firm*—Knobbe, Martens, Olson & Bear, LLP (57) ABSTRACT

An intake control system includes a control device that changes a length of an intake conduit between the length of connection and the length of disconnection that is shorter than the length of connection. The control device also includes a processor that determines whether or not the length of the intake conduit is to be changed. A condition for determining a change from the length of connection to the length of disconnection includes that an engine load is higher than a first threshold value. Also, a condition for determining a change from the length of disconnection to the length of connection includes that the engine load is lower than a second threshold value, which is lower than the first threshold value.

14 Claims, 8 Drawing Sheets

INTAKE CONTROL DEVICE FOR A VEHICLE

RELATED APPLICATIONS

This application is related to, and claims priority from, Japanese Patent Application No. 2006-255051, filed Sep. 20, 2006, the entirety of which is hereby incorporated by reference herein and made a part of the present specification.

BACKGROUND OF THE INVENTION

1. Field of the Invention

The present invention relates to intake control devices and methods for changing a length of an engine air intake conduit to vary an output characteristic of the engine. The present invention also relates to a straddle type vehicle employing such devices and methods.

2. Description of the Related Art

Certain straddle type vehicles such as, for example, motorcycles, employ an engine air intake control device in which a length of an intake conduit is changed from a first length to a length shorter than the first length when an engine load (such as, for example, an engine speed or a throttle valve opening) reaches a predetermined threshold value. Thereby, an output characteristic of the engine can be varied. One example of such a variable length intake system is shown in Japanese Publication No. 09-100720.

Figure 8:
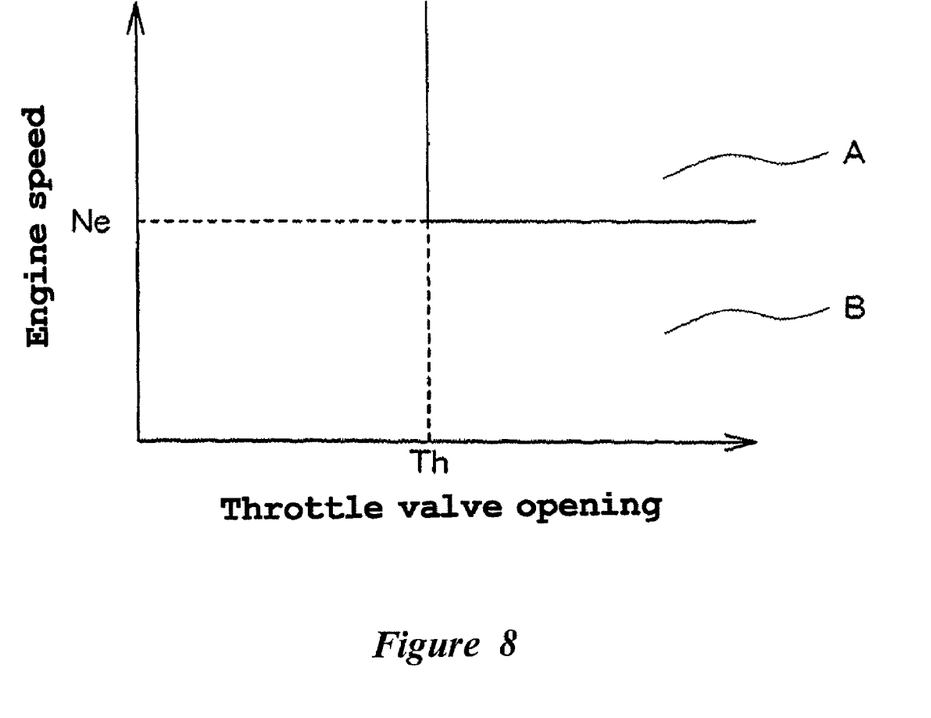
FIG. 8 is a graph that illustrates an example of a prior art control process for changing the length of the intake conduit.

FIG. 8 is a graph illustrating an example of a control process for changing a length of an intake conduit according to a prior intake device, such as the device of Japanese Publication No. 09-100720. The horizontal axis of the graph indicates throttle valve opening and the vertical axis of the graph indicates engine speed. The intake control device changes a length of an intake conduit from a first length to a length shorter than the first length when, for example, the throttle valve opening exceeds a predetermined threshold value Th and an engine speed exceeds a predetermined threshold value Ne (i.e., when a running state reaches an area indicated by the letter A in FIG. 8). Afterwards, the intake control device returns the length of the intake conduit to the first length when the throttle valve opening falls below the threshold value Th or the engine speed falls below the threshold value Ne (i.e., when the running state reaches an area indicated by the letter B in FIG. 8).

SUMMARY OF THE INVENTION

However, a drawback of an intake control device as described above is that it does not afford a comfortable ride feeling because the length of the intake conduit frequently changes with frequent variations of the engine load in the proximity of the threshold value. One or more preferred embodiments of the present invention provides an intake control device that can avoid improper changes of a length of an intake conduit even though an engine load frequently varies.

A preferred embodiment of the present invention involves a variable length air intake system for an engine, including a variable length intake conduit that is moveable between a first orientation, in which the intake conduit defines a first length, and a second orientation, in which the intake conduit defines a second length. A control device moves the intake conduit between the first orientation and the second orientation. The intake conduit is moved from the first orientation to the second orientation when an engine load is above a first threshold value, and the intake conduit is moved from the second orientation to the first orientation when the engine load is below a second threshold value that is different from the first threshold value.

A preferred embodiment of the present invention involves an air intake system as described above incorporated onto a straddle type vehicle.

According to one or more embodiments of the present invention, improper changes of the length of the intake conduit can be avoided even though the engine load frequently varies.

A preferred embodiment of the present invention involves an air intake system as described above, further including, as a condition for determining the change from the first length to the second length, a condition that the engine load is higher than the first threshold value for an elapsing time that is longer than a threshold time.

Accordingly, improper changes of the length of the intake conduit can be more surely avoided when the length of the intake conduit is set shorter.

Further, a preferred embodiment of the present invention involves an air intake system as described above, in which the intake conduit includes a fixed conduit connected to an engine and a movable conduit movable between a connected position where the movable conduit is connected to the fixed conduit and a disconnected position where the movable conduit is spaced apart from the connected position.

BRIEF DESCRIPTION OF THE DRAWINGS

These and other features, aspects and advantages of the present invention are described below with reference to drawings of one or more preferred embodiments, which are intended to illustrate, and not to limit, the present invention. The drawings contain eight (8) figures.

DETAILED DESCRIPTION OF THE PREFERRED EMBODIMENTS

Figure 1:
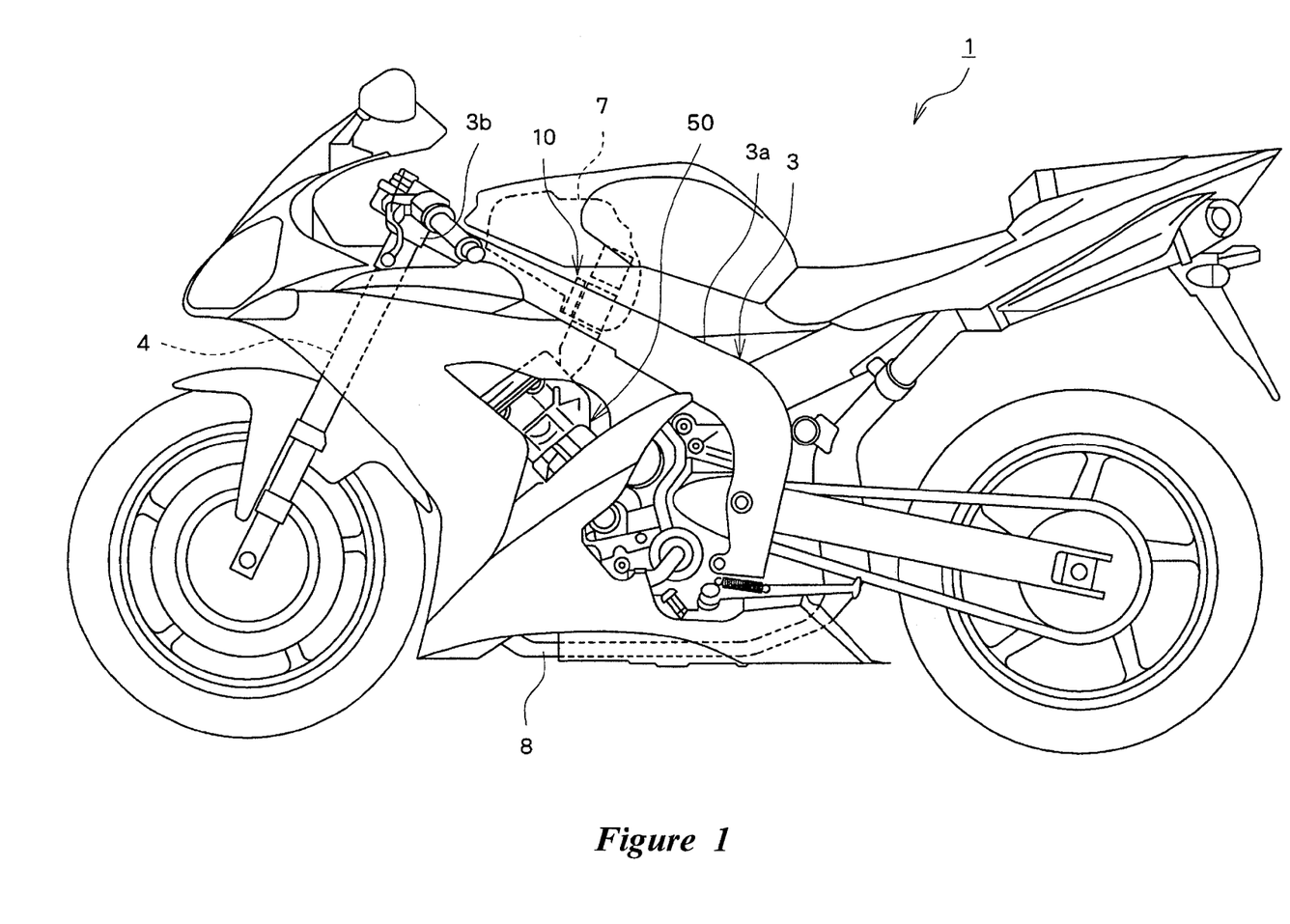
FIG. 1 is a side elevational view of a motorcycle that incorporates an engine air intake control device having certain features, aspects and advantages of the present invention.
Figure 2:
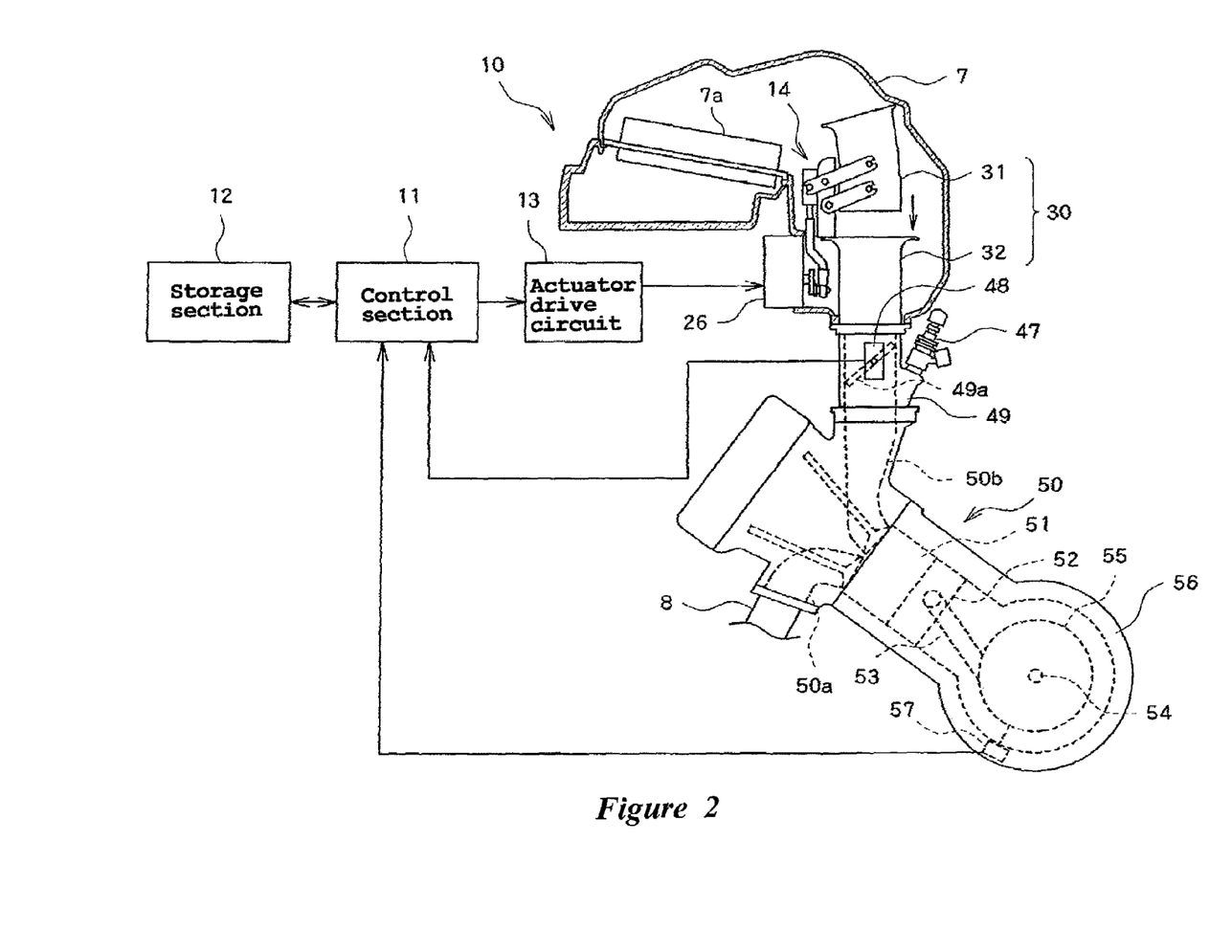
FIG. 2 is a partial schematic diagram showing the intake control device and an engine of the motorcycle of FIG. 1.

Hereinafter, preferred embodiments of the present invention are described with reference to several drawings. FIG. 1 is a side elevational view of a motorcycle 1 having an intake control device 10, which includes certain features, aspects and advantages of the present invention. FIG. 2 is a partial schematic diagram showing structures of the intake control device 10 and an engine 50 of the motorcycle 1.

As shown in FIG. 1, the motorcycle 1 includes a vehicle frame 3 that supports the engine 50. Also, as shown in FIG. 2, the intake control device 10 includes a control section 11 (controller), a storage section 12 (memory), an actuator drive circuit 13 (actuator) and an intake conduit length varying mechanism 14.

As shown in FIG. 1, the vehicle frame 3 includes a main frame 3a. A front end portion of the main frame 3a has a steering head section 3b supporting a steering shaft, to which a front fork assembly 4 is coupled. The main frame 3a extends obliquely downward to the rear of the vehicle body from the steering head section 3b. The engine 50 is disposed below the main frame 3a.

As shown in FIG. 2, exhaust ports 50a are defined in the engine 50. Exhaust conduits 8 are connected to the respective exhaust ports 50a. Also, intake ports 50b are defined in the engine 50. Throttle bodies 49 are connected to the respective intake ports 50b. Fuel injectors 47 are attached to the respective throttle bodies 49 to inject fuel to intake passages of the throttle bodies 49. A throttle valve 49a is placed in the intake passage of each throttle body 49. A throttle valve position sensor 48 is attached to a lateral side of one throttle body 49 to detect a throttle valve opening position. The throttle valve position sensor 48 outputs a voltage signal corresponding to the throttle valve opening position to the control section 11.

An air cleaner 7 is disposed above the engine 50. Air passing through a filter 7a of the air cleaner 7 and filtered thereby flows into the throttle bodies 49. The air cleaner 7 contains intake conduits 30 through which the air flows to be delivered to the engine. Air introduced into the air cleaner 7 passes through the intake conduits 30 and flows into the throttle bodies 49. Additionally, as is described below, each of the illustrated intake conduit 30 (or conduits 30, if multiple throttle bodies 49 are present) includes a fixed conduit 32 which is connected to the associated throttle body 49 and is fixed thereto, and a movable conduit 31 which is movable between a coupled position, in which the movable conduit 31 is connected to the fixed conduit 32, and an uncoupled position, in which the movable conduit 31 is spaced apart from the fixed conduit 32. Because the movable conduit 31 is connected to the fixed conduit 32 or is spaced apart from the fixed conduit 32, the length of the passage of each intake conduit 30 through which the air flows can be changed. Thereby, the output characteristic of the engine 50 (e.g., such as an output torque) can be varied.

A cylinder 51 of the engine 50 contains a piston 52. A top end of a connecting rod 53 is coupled to the piston 52, while a bottom end thereof is coupled to a crankshaft 54. A flywheel 55 is mounted to the crankshaft 54. A crank angle sensor 57 is attached to the crankcase 56 to face an outer circumferential surface of the flywheel 55. The crank angle sensor 57 outputs pulse signals with a frequency corresponding to an engine speed. The control section 11 detects a rotational speed of the engine 50 (hereinafter called "engine speed") based upon the frequency with which the signals are inputted.

As described above, the illustrated intake control device 10 includes at least the control section 11, the storage section 12, the actuator drive circuit 13 and the intake conduit length varying mechanism 14. The intake conduit length varying mechanism 14 is a mechanism which changes the length of the passage through which the air flows within the intake conduit 30 (hereinafter called "intake conduit length"). As described above, in the example provided herein, the intake conduit 30 includes the fixed conduit 32 and the movable conduit 31. Also, the intake conduit length varying mechanism 14 includes an actuator 26 which changes a position of the movable conduit 31.

The movable conduit 31 moves relative to the fixed conduit 32 between a position where the movable conduit 31 is connected to the fixed conduit 32 and another position where the movable conduit 31 is spaced apart from the connected position. Thereby, the intake conduit length given when the movable conduit 31 is connected to the fixed conduit 32 (first length) is set longer than the intake conduit length given when the movable conduit 31 is spaced apart from the fixed conduit 32 (second length). However, other variable length intake conduit arrangements are also possible, such as a telescoping arrangement of the conduits, for example.

The actuator 26 is driven with the drive power supplied from the actuator drive circuit 13 to move the movable conduit 31. The actuator drive circuit 13 supplies a drive current, which corresponds to the signal inputted from the control section 11, to the actuator 26.

The control section 11 includes the CPU (central processing unit) and controls various electrical components mounted to the vehicle body in accordance with programs stored in the storage section 12. Particularly, in the illustrated arrangement, the control section 11 moves the movable conduit 31 in accordance with an engine load (for example, an engine speed and a throttle valve opening) to execute processes for changing the intake conduit length. The processes executed by the control section 11 are described in greater detail below.

The storage section 12 can include both non-volatile memory and volatile memory to hold programs executed by the control section 11.

Figure 3:
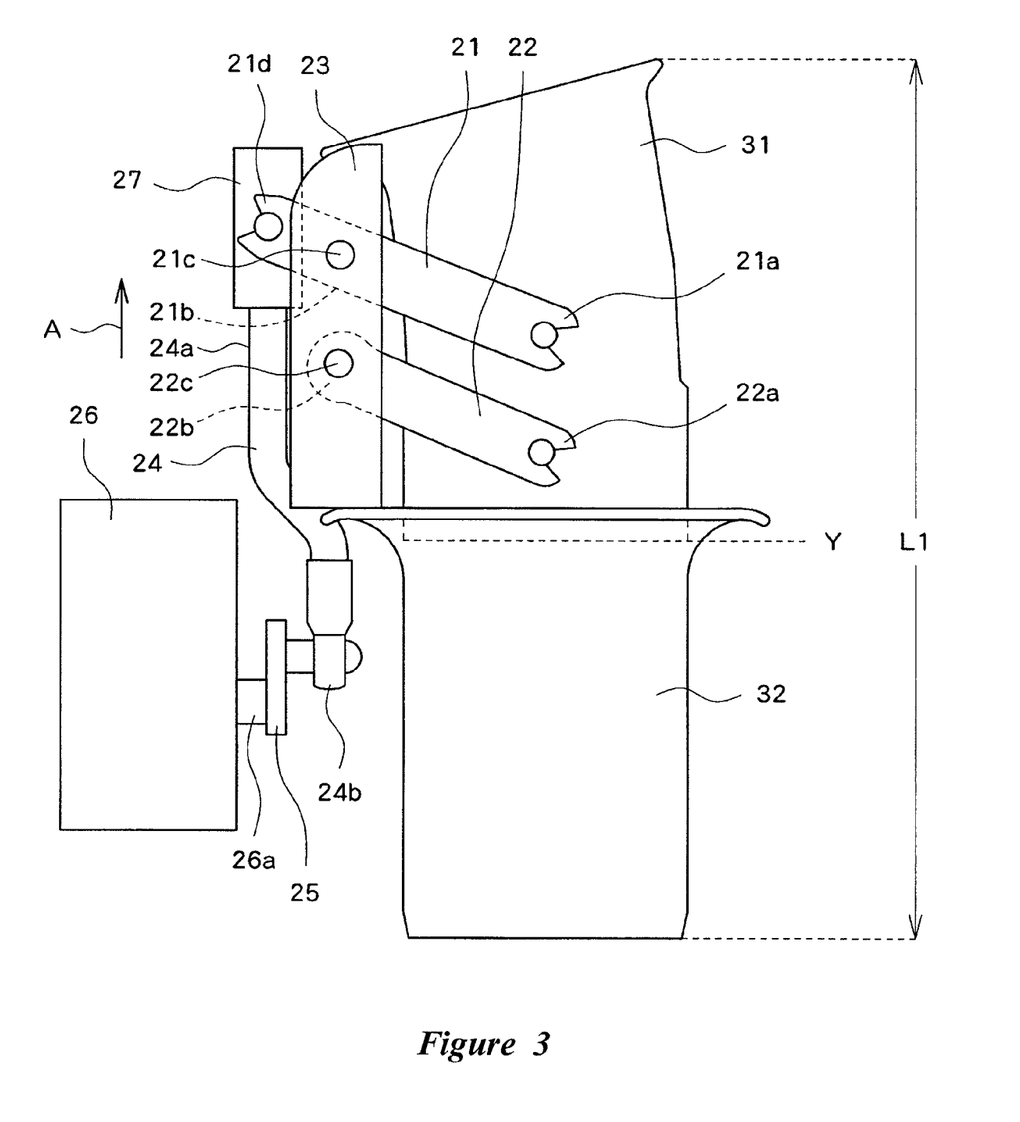
FIG. 3 is a partial schematic view showing an example of an intake conduit length varying mechanism of the intake control device. A movable conduit in the figure is connected to a fixed conduit.
Figure 4:
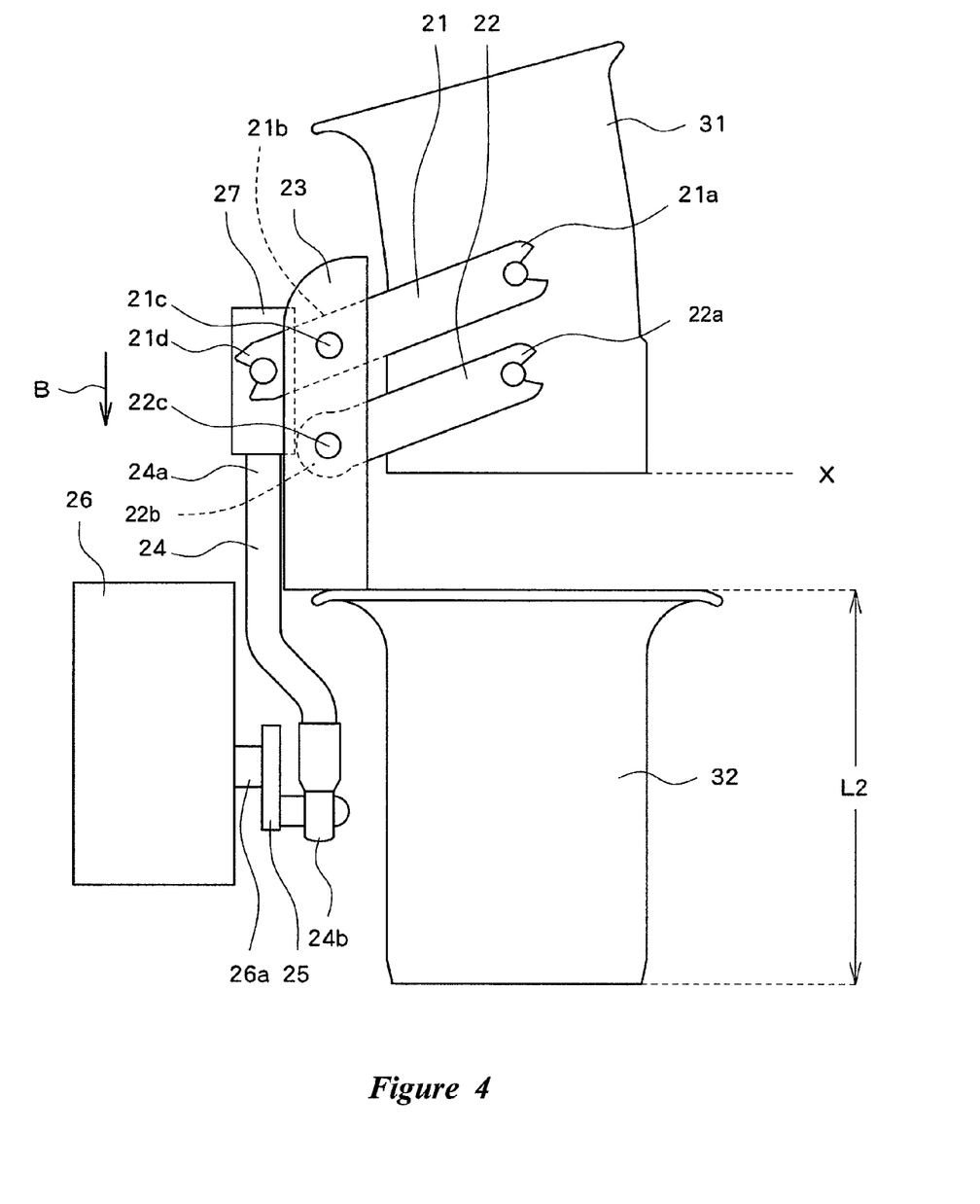
FIG. 4 is a partial schematic view showing the intake conduit length varying mechanism of FIG. 3. The movable conduit in the figure is spaced apart from the fixed conduit.

FIGS. 3 and 4 are partial schematic views of the intake conduit length varying mechanism 14. Additionally, in the example shown in FIG. 3, the movable conduit 31 is placed at a position Y where the movable conduit 31 is connected to the fixed conduit 32 (hereunder called "connected position"). The movable conduit 31, as shown in FIG. 4, is placed at a position X where the movable conduit 31 is spaced apart from the fixed conduit 32 (hereunder called "disconnected position").

The movable conduit 31 is supported by one end 21a of an upper arm 21 and one end 22a of a lower arm 22 for movement in a vertical direction. The upper arm 21 and the lower arm 22 are arranged adjacent one another in the vertical direction and extend parallel to one another. The other end 22b of the lower arm 22 is supported by a pillar 23 extending upward from a rim portion of the fixed conduit 32, while a mid portion 21b of the upper arm 21 is supported by the pillar 23. Each of the other end 22b and the mid portion 21b has a fulcrum 21c, 22c. The upper arm 21 and the lower arm 22 are pivotable about the respective fulcrums 21c, 22c in a manner that the upper and lower arms 21, 22 remain parallel to one another. The other end 21d of the upper arm 21 is connected to one end 24a of an arm 24 which is movable vertically through a connecting member 27, which may be a lost-motion device. The other end 24b of the arm 24 is connected to an output shaft 26a of the actuator 26 through a coupling member 25. The coupling member 25 extends in a radial direction of the output shaft 26a. Therefore, the other end 24b of the arm 24 is spaced apart from the output shaft 26a of the actuator 26 in the radial direction.

An operation of the illustrated intake conduit length varying mechanism 14 is now described. When the output shaft 26a of the actuator 26 rotates to raise the arm 24 upward (in the direction indicated by the arrow A of FIG. 3), the upper arm 21 and the lower arm 22 pivot downward about the respective fulcrums 21c, 22c. As a result, the movable conduit 31 moves downward toward the connected position Y. When in the connected position Y, the intake conduit length is set to the length L1 (hereinafter called "the length of connection") that is made by adding the lengths of the movable conduit 31 and the fixed conduit 32. On the other hand, when the output shaft 26a of the actuator 26 rotates in the reverse direction to lower the arm 24 downward (in the direction indicated by the arrow B of FIG. 4), the upper arm 21 and the lower arm 22 pivot upward about the respective fulcrums 21c, 22c. As a result, the movable conduit 31 moves upward toward the disconnected position X. In the disconnected position X, the length of the movable conduit 31 is no longer included in the intake conduit length. The intake conduit length is thus set to the length L2 (hereinafter called "the length of disconnection") that is shorter than the length of connection L1. Additionally, in accordance with processes executed by the control section 11, which are describe in greater detail below, the movable conduit 31 is placed at the disconnected position X when the engine load is high such as, for example, when the vehicle is accelerated, and the movable conduit 31 is placed at the connected position Y when the engine load is low.

Figure 5:
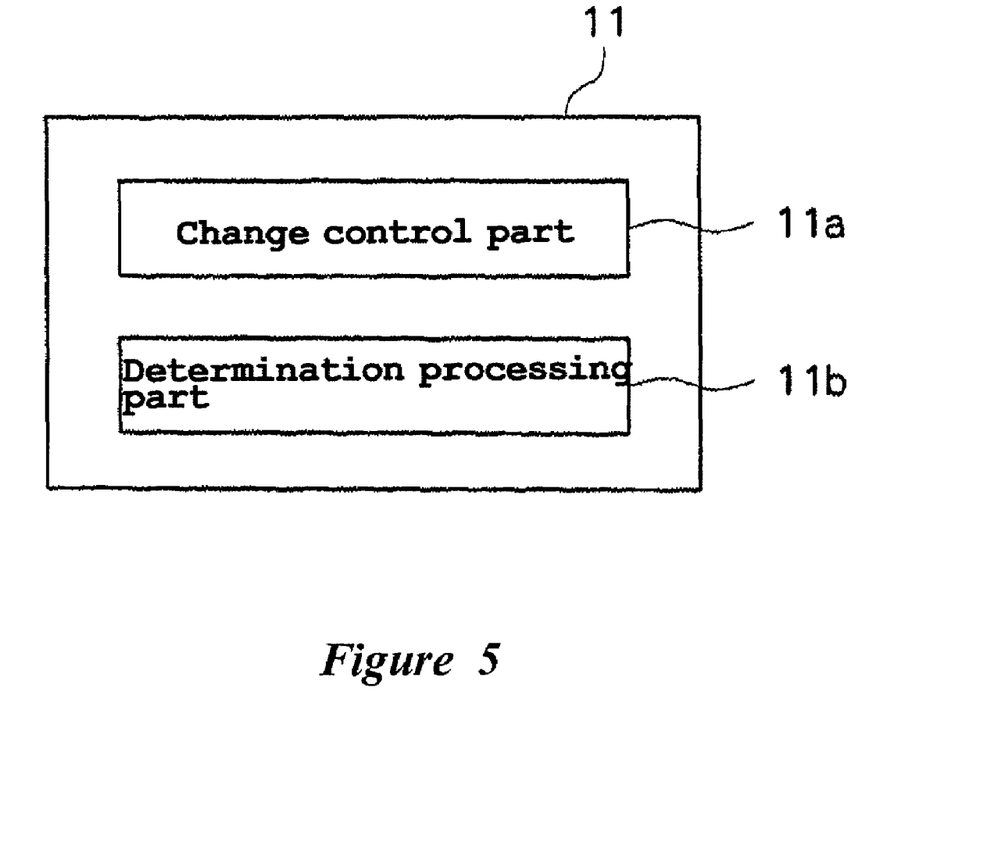
FIG. 5 is a block diagram of a preferred control section incorporated in the intake control device.

The processes executed by one or more preferred embodiments of the control section 11 are described below. FIG. 5 is a functional block diagram showing the processes executed by the control section 11. As shown in FIG. 5, the control section 11 includes a change control part 11a and a determination processing part 11b.

The change control part 11a executes processes for changing the intake conduit length between the length of connection L1 and the length of disconnection L2 in response to a determination result of the determination processing part 11b, which is described in greater detail below. Specifically, if a running state of the vehicle is determined to correspond to a predetermined condition (hereunder called "condition of connection") in processing by the determination processing part 11b, described below, when the movable conduit 31 is placed at the disconnected position X, the change control part 11a executes processes to move the movable conduit 31 from the disconnected position X to the connected position Y. Also, if the running state is determined to correspond to another predetermined condition (hereunder called "condition of disconnection") in the processing by the determination processing part 11b when the movable conduit 31 is placed at the connected position Y, the change control part 11a executes processes to move the movable conduit 31 from the connected position Y to the disconnected position X.

The processing for changing the intake conduit length is executed, for example, as follows. A position detecting sensor (for example, a potentiometer) for detecting a position of the movable conduit 31 is provided in the intake conduit length varying mechanism 14. The change control part 11a outputs a signal commanding a drive of the actuator 26 to the actuator drive circuit 13 while detecting the position of the movable conduit 31 based upon a signal inputted from the position detecting sensor. When the movable conduit 31 reaches the connected position Y or the disconnected position X, the change control section 11a stops outputting the signal to the actuator drive circuit 13 to stop driving of the actuator 26.

Alternatively, the change control part 11a can drive the actuator 26 for a predetermined period of time to move the movable conduit 31 from the connected position Y to the disconnected position X without requiring detection of the position of the movable conduit 31. In such an arrangement, the predetermined time is a required time for the movable conduit 31 to move from the connected position Y to the disconnected position X or from the disconnected position X to the connected position Y. The predetermined time can be set in a production stage, or the like, of the intake control device 10.

The determination processing part 11b determines whether or not the intake conduit length is to be changed as a result of the processing by the change control part 11a discussed above. Specifically, the determination processing part 11b determines whether or not the running state of the vehicle corresponds to the condition of disconnection under which the intake conduit length needs to be changed to the length of disconnection L2, if the intake conduit length is set to the length of connection L1. On the other hand, the determination processing part 11b determines whether or not the running state corresponds to the condition of connection under which the intake conduit length needs to be changed to the length of disconnection L2, if the intake conduit length is set to the length of disconnection L2.

For example, the determination processing part 11b determines whether the engine load reaches a disconnection threshold value, which can be a predetermined value set during manufacture, in order to determine whether or not the running state corresponds to the condition of disconnection, i.e., whether or not the intake conduit length needs to be short. On the other hand, the determination processing part 11b determines whether the engine load falls below a connection threshold value which is set lower than the above threshold value, in order to determine whether or not the running state corresponds to the condition of connection, i.e., whether or not the intake conduit length needs to be long. Thereby, improper changes of the intake conduit length can be avoided even though, for example, the rider frequently operates the throttle valve and the running state frequently varies in the proximity of the change condition of the intake conduit length. Additionally, the engine load can include, for example, a throttle valve opening and an engine speed. The determination processing by the determination processing part 11b may be executed, for example, as described immediately below.

First, the determination processes is described in connection with an example in which a threshold value for the engine speed is set. In this example, the determination processing part 11b calculates an engine speed based upon signals inputted from the crank angle sensor 57 with a preset sampling cycle (for example, dozens of milliseconds). When the movable conduit 31 is placed at the connected position Y, the determination processing part 11b determines whether or not the engine speed exceeds a predetermined threshold value (hereinafter called "engine speed threshold value for acceleration") is determined whenever the determination processing part 11b calculates the engine speed. The determination processing part 11b determines that the running state of the vehicle corresponds to the condition of disconnection when the engine speed exceeds the engine speed threshold value for acceleration. As a result, the change control part 11a moves the movable conduit 31 to the disconnected position X to set the intake conduit length to the length of disconnection L2.

In the meantime, when the movable conduit 31 is placed at the disconnected position X, the determination processing part 11b determines whether or not the engine speed falls below a threshold value (hereunder called "engine speed threshold value for deceleration") which is different than, and in the illustrated arrangement lower than, the engine speed threshold value for acceleration is determined whenever the determination processing part 11b calculates the engine speed. The determination processing part 11b determines that the running state of the vehicle corresponds to the condition of connection when the engine speed falls below the engine speed threshold value for deceleration. As a result, the change control part 11a moves the movable conduit 31 to the connected position Y to set the intake conduit length to the length of connection L1.

In such an arrangement, a difference between the engine speed threshold value for acceleration and the engine speed threshold value for deceleration is, for example, a predetermined value. Alternatively, the difference can be updated in response to a frequency of changes in the engine speed. For example, the control section 11 detects engine speeds with predetermined sampling cycles and calculates a frequency at which the engine speeds exceed a predetermined value (hereunder called "engine speed threshold value updating determination value") per unit time. Then, the difference between the engine speed threshold value for acceleration and the engine speed threshold value for deceleration can be updated based upon the frequency. For example, the more the frequency at which the engine speeds exceed the engine speed threshold value updating determination value increases, the greater the difference that is set.

Next, the determination processing is described in connection with another example in which a threshold value for the throttle valve opening position is set. In this example, the determination processing part 11*b* detects a throttle valve opening position based upon signals inputted from the throttle valve position sensor 48 with predetermined sampling cycles. When the movable conduit 31 is in the connected position Y, the determination processing part 11*b* determines whether or not the throttle valve opening position exceeds a predetermined threshold value (hereinafter called "throttle valve opening threshold value for acceleration") is determined whenever the determination processing part 11*b* detects the throttle valve opening position. The determination processing part 11*b* determines that the running state corresponds to the condition of disconnection when the throttle valve opening position exceeds the throttle valve opening threshold value for acceleration.

On the other hand, when the movable conduit 31 is in the disconnected position X, the determination processing part 11*b* determines whether or not the throttle valve opening position falls below a threshold value (hereinafter called "throttle valve opening threshold value for deceleration") which is different than, and in the illustrated arrangement lower than, the throttle valve opening threshold value for acceleration is determined whenever the determination processing part 11*b* detects the throttle valve opening position. The determination processing part 11*b* determines that the running state corresponds to the condition of connection when the throttle valve opening position falls below the throttle valve opening threshold value for deceleration.

With such an arrangement, a difference between the throttle valve opening threshold value for acceleration and the throttle valve opening threshold value for deceleration is, for example, a predetermined value. Alternatively, the difference can be updated in response to a frequency of change in the throttle valve opening position. For example, the control section 11 detects throttle valve opening position with predetermined sampling cycles and calculates a frequency at which the throttle valve opening position exceeds a predetermined value (hereunder called "throttle valve opening threshold value updating determination value") per unit time. Then, the difference between the throttle valve opening threshold value for acceleration and the deceleration moment throttle valve threshold value can be updated based upon the frequency. For example, the more the frequency at which the throttle valve opening position exceeds the throttle valve opening threshold value updating determination value increases, the greater the difference that is set. Accordingly, improper changes of the intake conduit length can be more effectively avoided when the rider drives the vehicle during which the throttle valve is frequently operated (i.e., the throttle position is frequently changed).

Also, the determination processing part 11*b* can determine whether or not the engine load continues to exceed the engine speed threshold value for acceleration or the throttle valve opening threshold value for acceleration longer than a predetermined period of time (hereunder called "necessary time for acceleration") in order to determine whether or not the running state corresponds to the condition of disconnection. Thereby, frequent changes of the intake conduit length during acceleration can be avoided. Ride feelings during acceleration thus can be enhanced. Processing in such an arrangement case can be executed, for example, as described below.

If the determination processing part 11*b* determines that the throttle valve opening position exceeds the throttle valve opening threshold value for acceleration when the movable conduit 31 is in the connected position Y, the determination processing part 11*b* starts to count an elapsing time. Then, the determination processing part 11*b* determines that the running state corresponds to the condition of disconnection when the throttle valve opening position, which continues to exceed the throttle valve opening threshold value for acceleration, is detected over the necessary time for acceleration.

Additionally, the determination processing part 11*b* can determine whether or not the engine load continues to exceed the engine speed threshold value for deceleration or the throttle valve opening threshold value for deceleration longer than a predetermined period of time (hereinafter called "necessary time for deceleration") in order to determine whether or not the running state corresponds to the condition of connection. In some arrangements, the necessary time for deceleration is different from, and in the illustrated arrangement set shorter than, the necessary time for acceleration.

Figure 6:
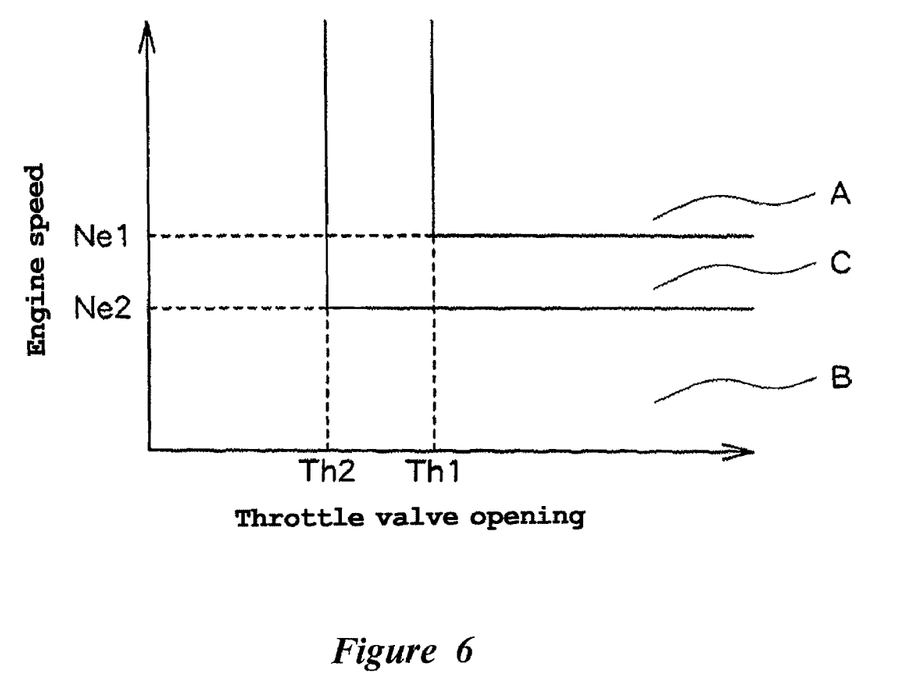
FIG. 6 is a graph illustrating an example of a control process for changing a length of an intake conduit.

Also, both threshold values of the engine speed and the throttle valve opening can be set. FIG. 6 is a graph illustrating an example of the change control of the intake conduit length executed by the control section 11 in such a case. The horizontal axis of FIG. 6 indicates throttle valve opening position, while the vertical axis thereof indicates engine speed.

When the movable conduit 31 is in the connected position Y, the determination processing part 11*b* determines whether or not the engine speed exceeds the engine speed threshold value Ne1 for acceleration and the throttle valve opening position exceeds the throttle valve opening threshold value Th1 for acceleration with predetermined sampling cycles. Then, if the running state of the vehicle reaches the state (the area indicated by the letter A in FIG. 6) satisfying those conditions (i.e., the condition of disconnection), the change control part 11*a* moves the movable conduit 31 to the disconnected position X to change the intake conduit length from the length of connection L1 to the length of disconnection L2. Afterwards, the determination processing part 11*b* determines whether or not at least one of the conditions is satisfied: 1) the engine speed falls below the engine speed threshold value Ne2 for deceleration with the predetermined sampling cycles; and 2) the throttle valve opening position falls below the throttle valve opening threshold value Th2 for deceleration with the predetermined sampling cycles. Then, when the running state of the vehicle reaches a state (the area indicated by the letter B in FIG. 6) corresponding to either one of the conditions (the condition of connection), the change control part 11*a* moves the movable conduit 31 to the connected position Y to change the intake conduit length from the length of disconnection L2 to the length of connection L1.

As shown in FIG. 6, in this example as well, the engine speed threshold value Ne2 for deceleration is set lower than the engine speed threshold value Ne1 for acceleration, and the throttle valve opening threshold value Th2 for deceleration is set lower than the throttle valve opening threshold value Th1 for acceleration. As a result, even if the running state of the vehicle frequently varies in the area indicated by the letter C in FIG. 6, a change of the intake conduit length is avoided.

Additionally, the determination processing part 11b detects a present intake conduit length (the length of connection L1 or the length of disconnection L2) by detecting a position of the movable conduit 31. For example, if the intake conduit length varying mechanism 14 has a position detecting sensor, the determination processing part 11b detects the position of the movable conduit 31 based upon a signal inputted from the position detecting sensor. Also, when the movable conduit 31 reaches the disconnected position X or the connected position Y, the change control part 11a can store information indicating the present position of the movable conduit 31 (hereunder called "position information") to the storage section 12. In addition, the determination processing part 11b can detect the present position of the movable conduit 31 based upon the position information.

Figure 7:
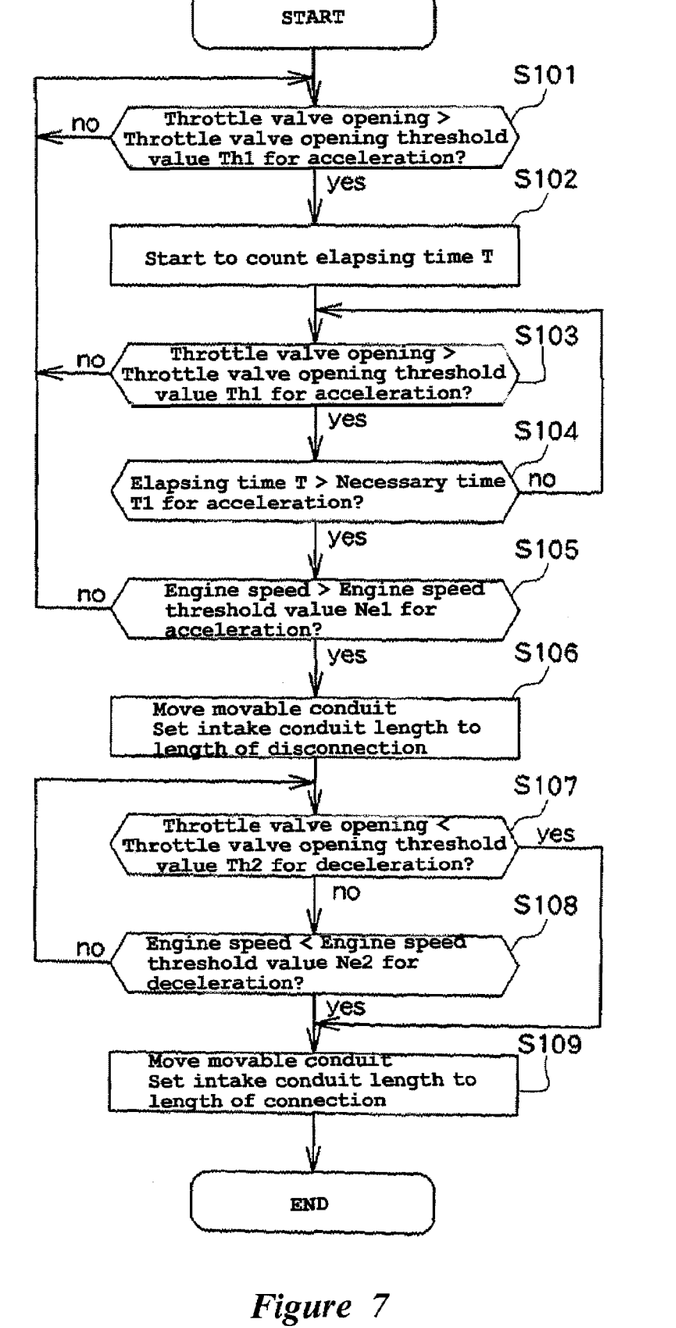
FIG. 7 is a flowchart showing an example of a control process executed by the control section.

A flow diagram of a preferred control process executed by the control section 11 is described below with reference to FIG. 7. In the example described below, it is the condition of disconnection that both of the conditions are satisfied: 1) the engine speed exceeds the engine speed threshold value for acceleration; and 2) the throttle valve opening, which continues to exceed the throttle valve opening threshold value for acceleration, is detected over the necessary time for acceleration. Also, it is the condition of connection that either one of conditions is satisfied: 1) the engine speed falls below the engine speed threshold value for deceleration; or 2) the throttle valve opening falls below the throttle valve opening threshold value for deceleration. In addition, the movable conduit 31 is initially in the connected position Y.

First, the determination processing part 11b executes a process for determining whether or not the running state of the vehicle corresponds to the condition of disconnection. Specifically, the determination processing part 11b detects a throttle valve opening position and determines whether or not the throttle valve opening position exceeds the throttle valve opening threshold value Th1 for acceleration (S101). If the throttle valve opening position does not exceed the throttle valve opening threshold value Th1 for acceleration, the determination processing part 11b executes the process of S101 with predetermined sampling cycles until the throttle valve opening position exceeds the throttle valve opening threshold value Th1 for acceleration. On the other hand, if the detected throttle valve opening position exceeds the throttle valve opening threshold value Th1 for acceleration, the determination processing part 11b starts to count the elapsing time T from the initial moment that the throttle valve opening position exceeds the throttle valve opening threshold value Th1 (S102).

Afterwards, the determination processing part 11b again detects a throttle valve opening position and determines whether the throttle valve opening exceeds the throttle valve opening threshold value Th1 for acceleration or not (S103). If the throttle valve opening position does not exceed the throttle valve opening threshold value Th1 for acceleration, the determination processing part 11b returns to the process of S101. On the other hand, if the detected throttle valve opening position exceeds the throttle valve opening threshold value Th1 for acceleration, the determination processing part 11b determines whether or not the elapsing time T has exceeded the necessary time for acceleration T1 (S104). If the elapsing time T has not yet exceeded the necessary time for acceleration T1, the determination processing part 11b returns to the process of S103 after the sampling cycle ends to detect another throttle valve opening position.

On the other hand, in the determination of S104, if the elapsing time T has exceeded the necessary time for acceleration T1, the determination processing part 11b detects an engine speed and determines whether or not the engine speed exceeds the engine speed threshold value Ne1 for acceleration (S105). If the engine speed does not exceed the engine speed threshold value Ne1 for acceleration, the determination processing part 11b returns to S101 and again executes the processes that follow.

On the other hand, if the engine speed exceeds the engine speed threshold value Ne1 for acceleration, the determination processing part 11b determines that the running state of the vehicle corresponds to the condition of disconnection. As a result, the change control part 11a moves the movable conduit 31 to the disconnected position X to set the intake conduit length to the length of disconnection L2 (S106).

Next, the determination processing part 11b executes a process for determining whether or not the running state of the vehicle corresponds to the condition of connection. Specifically, the determination processing part 11b detects a throttle valve opening position and determines whether or not the throttle valve opening position is lower than the throttle valve opening threshold value Th2 for deceleration (S107). If the throttle valve opening position is lower than the throttle valve opening threshold value Th2 for deceleration, the determination processing part 11b determines that the running state of the vehicle corresponds to the condition of connection. As a result, the change control part 11a moves the movable conduit 31 to the connected position Y to set the intake conduit length to the length of connection L1 (S109).

On the other hand, in the determination of S107, if the throttle valve opening position is not lower than the throttle valve opening threshold value Th2 for deceleration, the determination processing part 11b detects an engine speed and determines whether or not the engine speed is lower than the engine speed threshold value Ne2 for deceleration (S108). If the engine speed is not lower than the engine speed threshold value Ne2 for deceleration, the determination processing part 11b returns to S107 and again executes the processes that follow. On the other hand, if the engine speed is lower than the engine speed threshold value Ne2 for deceleration, the determination processing part 11b determines that the running state of the vehicle corresponds to the condition of connection. As a result, the change control part 11a moves the movable conduit 31 to the connected position Y to set the intake conduit length to the length of connection L1 (S109). During the running of the vehicle, the control section 11 repeats the processes described above.

In the intake control device 10 described above, the threshold values decided for the condition of connection (in this embodiment, the engine speed threshold value for deceleration, the throttle valve opening threshold value for deceleration, and so forth) are lower than the threshold values decided for the condition of disconnection (in this embodiment, the engine speed threshold value for acceleration, the throttle valve opening threshold value for acceleration, and so forth). As a result, even though the running state frequently varies in the proximity of the change conditions of the intake conduit length, improper changes of the intake conduit length can be avoided and the ride feelings can be enhanced. In alternative arrangements, the thresholds may be reversed, with the disconnection thresholds being set lower than the connection thresholds.

Additionally, the present invention is not limited to the intake control device 10 described above and can be modified in various ways. For example, in the flowchart shown in FIG. 7, the threshold values are set to both of the engine speed and the throttle valve opening position in the condition of connection and the condition of disconnection. However, the threshold values can be set to either one of the engine speed and the throttle valve opening position.

Also, in the intake conduit length varying mechanism 14 incorporated by the intake control device 10, the intake conduit length is changed by connecting the movable conduit 31 to the fixed conduit 32 or by disconnecting the movable conduit 31 from the fixed conduit 32. However, for example, the intake conduit length varying mechanism can have a plurality of intake passages as intake conduits, through which air supplied to the engine flows, and valves can be positioned within the respective intake passages. In this connection, the control section 11 can change the intake conduit length by opening or closing the valves in accordance with an engine load or the like.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present intake control device has been described in the context of particularly preferred embodiments, the skilled artisan will appreciate, in view of the present disclosure, that certain advantages, features and aspects of the device may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A variable length air intake system for an engine, comprising:
   a variable length intake conduit that is moveable between a first orientation, in which the intake conduit defines a first length, and a second orientation, in which the intake conduit defines a second length; and
   a control device that moves the intake conduit between the first orientation and the second orientation;
   wherein the intake conduit is moved from the first orientation to the second orientation when an engine load is above a first threshold value, which is determined at least in part based on a throttle valve position being above a first threshold position, and the intake conduit is moved from the second orientation to the first orientation when the engine load is below a second threshold value that is different from the first threshold value, which is determined at least in part based on the throttle valve position being below a second threshold position that is different from the first threshold position.

2. The intake system of claim 1, wherein the control device only changes the intake conduit from the first orientation to the second orientation if the engine load remains above the first threshold value for an elapsed time that is longer than a threshold time.

3. The intake system of claim 1, wherein the first length is longer than the second length.

4. The intake system of claim 3, wherein the intake conduit comprises a fixed conduit that is coupled to the engine and a movable conduit that is movable between a connected position, wherein the movable conduit cooperates with the fixed conduit to define the first length of the intake conduit, and a disconnected position, wherein the movable conduit is spaced apart from the fixed conduit such that only the fixed conduit defines the second length of the intake conduit, and the control device changes the length of the intake conduit by moving the movable conduit between the connected position and the disconnected position.

5. The intake system of claim 1, wherein the first threshold value is greater than the second threshold value.

6. The intake system of claim 1, wherein the intake system is incorporated onto a straddle type vehicle.

7. The intake system of claim 1, wherein the engine load is determined at least in part based on an engine speed.

8. A method of controlling a variable length air intake system for an engine, comprising:
   determining if an engine load is above a first threshold value at least in part by determining if a throttle valve position is above a first threshold position;
   moving a variable length intake conduit from a first orientation, in which the intake conduit defines a first length, to a second orientation, in which the intake conduit defines a second length, if the engine load is above the first threshold value;
   determining if the engine load is below a second threshold value that is different from the first threshold value at least in part by determining if the throttle valve position is below a second threshold position that is different than the first threshold position;
   moving the intake conduit from the second orientation to the first orientation if the engine load is below the second threshold value.

9. The method of claim 8, wherein the moving of the variable intake conduit from the first orientation to the second orientation is performed only if the engine load remains above the first threshold value for an elapsed time that is longer than a threshold time.

10. The method of claim 8, wherein the first length is longer than the second length.

11. The method of claim 10, wherein the moving of the intake conduit from the first orientation to the second orientation involves moving a movable conduit to a disconnected position from a fixed conduit and wherein the moving of the intake conduit from the second orientation to the first orientation involves moving the movable conduit to a connected position with the fixed conduit.

12. The method of claim 8, wherein the first threshold value is greater than the second threshold value.

13. The method of claim 8, further comprising incorporating the intake system into a straddle type vehicle.

14. The method of claim 8, wherein the determining of the engine load is based at least in part on an engine speed of the engine.

* * * * *